(12) United States Patent
Gerovac et al.

(10) Patent No.: US 8,650,270 B2
(45) Date of Patent: Feb. 11, 2014

(54) DISTRIBUTED COMPUTING WITH MULTIPLE COORDINATED COMPONENT COLLECTIONS

(75) Inventors: Branko J. Gerovac, Lexington, MA (US); David C. Carver, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 647 days.

(21) Appl. No.: 12/170,624

(22) Filed: Jul. 10, 2008

(65) Prior Publication Data

US 2010/0011096 A1 Jan. 14, 2010

(51) Int. Cl.
*G06F 15/173* (2006.01)

(52) U.S. Cl.
USPC ............ 709/223; 709/224; 709/225; 709/226

(58) Field of Classification Search
USPC ......................................... 709/223, 224, 225
See application file for complete search history.

(56) References Cited

U.S. PATENT DOCUMENTS

| | | | |
|---|---|---|---|
| 3,746,780 A | 7/1973 | Stetten et al. | |
| 3,851,104 A | 11/1974 | Willard et al. | |
| 4,845,658 A | 7/1989 | Gifford | |
| 4,943,919 A * | 7/1990 | Aslin et al. | 701/3 |
| 5,132,992 A | 7/1992 | Yurt et al. | |
| 5,260,945 A * | 11/1993 | Rodeheffer | 714/4.5 |
| 5,581,552 A | 12/1996 | Civanlar et al. | |
| 5,581,784 A | 12/1996 | Tobagi et al. | |
| 5,583,995 A | 12/1996 | Gardner et al. | |
| 5,608,448 A | 3/1997 | Smoral et al. | |
| 5,640,563 A | 6/1997 | Carmon | |
| 5,787,482 A | 7/1998 | Chen et al. | |
| 5,805,804 A | 9/1998 | Laursen et al. | |
| 5,862,312 A | 1/1999 | Mann et al. | |
| 5,926,649 A * | 7/1999 | Ma et al. | 710/6 |
| 6,230,200 B1 | 5/2001 | Forecast et al. | |
| 6,374,336 B1 | 4/2002 | Peters et al. | |
| 6,401,126 B1 | 6/2002 | Douceur et al. | |
| 6,594,530 B1 * | 7/2003 | Glanzer et al. | 700/18 |
| 6,609,149 B1 | 8/2003 | Bandera et al. | |
| 6,721,398 B1 * | 4/2004 | Pitcher | 379/88.13 |

(Continued)

FOREIGN PATENT DOCUMENTS

| WO | WO 2008/137334 | 11/2008 |
|---|---|---|
| WO | WO 2010/006127 | 1/2010 |
| WO | WO 2010/006132 | 1/2010 |
| WO | WO 2010/006134 | 1/2010 |

OTHER PUBLICATIONS

PCT International Preliminary Report of Patentability, date mailed Nov. 19, 2009, for PCT/US2008/061401.

(Continued)

*Primary Examiner* — Backhean Tiv
(74) *Attorney, Agent, or Firm* — Harrity & Harrity, LLP

(57) ABSTRACT

A system having components that collectively perform functions and services of the system. The components are managed as belonging to at least a first component collection and a second component collection. The components of the first component collection operate at a time scale that is substantially temporally independent of the components of the second component collection. The components of the first component collection have a first set of temporal requirements and the components of the second component collection have a second substantially different set of temporal requirements.

20 Claims, 2 Drawing Sheets

(56) References Cited

U.S. PATENT DOCUMENTS

| | | | |
|---|---|---|---|
| 6,728,267 B1* | 4/2004 | Giese et al. | 370/469 |
| 6,988,126 B2* | 1/2006 | Wilcock et al. | 709/204 |
| 7,020,697 B1* | 3/2006 | Goodman et al. | 709/223 |
| 7,058,947 B1 | 6/2006 | Raja et al. | |
| 7,260,623 B2* | 8/2007 | Wookey et al. | 709/223 |
| 7,269,562 B2* | 9/2007 | Leask et al. | 704/275 |
| 7,277,978 B2 | 10/2007 | Khatami et al. | |
| 7,665,069 B2* | 2/2010 | Weber | 717/127 |
| 8,166,173 B2* | 4/2012 | Low et al. | 709/227 |
| 8,346,929 B1* | 1/2013 | Lai | 709/226 |
| 2003/0005457 A1 | 1/2003 | Faibish et al. | |
| 2003/0028530 A1* | 2/2003 | Nagaraja | 707/4 |
| 2003/0140051 A1* | 7/2003 | Fujiwara et al. | 707/100 |
| 2003/0195948 A1 | 10/2003 | Takao et al. | |
| 2004/0103437 A1 | 5/2004 | Allegrezza et al. | |
| 2004/0198386 A1 | 10/2004 | Dupray | |
| 2004/0218548 A1* | 11/2004 | Kennedy et al. | 370/254 |
| 2004/0219909 A1* | 11/2004 | Kennedy et al. | 455/422.1 |
| 2005/0044197 A1* | 2/2005 | Lai | 709/223 |
| 2005/0181803 A1 | 8/2005 | Weaver et al. | |
| 2005/0262246 A1 | 11/2005 | Menon et al. | |
| 2006/0005162 A1* | 1/2006 | Tseng et al. | 717/107 |
| 2006/0059253 A1* | 3/2006 | Goodman et al. | 709/223 |
| 2006/0062555 A1 | 3/2006 | Zimmermann et al. | |
| 2006/0087990 A1 | 4/2006 | Kakivaya et al. | |
| 2006/0190552 A1 | 8/2006 | Henze et al. | |
| 2006/0259662 A1 | 11/2006 | Furukawa et al. | |
| 2006/0272015 A1 | 11/2006 | Frank et al. | |
| 2007/0180150 A1* | 8/2007 | Eisner et al. | 709/246 |
| 2008/0037532 A1* | 2/2008 | Sykes et al. | 370/389 |
| 2008/0109580 A1 | 5/2008 | Carlson et al. | |
| 2008/0244033 A1 | 10/2008 | Hook et al. | |
| 2008/0273540 A1 | 11/2008 | Gerovac et al. | |
| 2009/0125690 A1* | 5/2009 | Kottomtharayil et al. | 711/154 |
| 2009/0311658 A1* | 12/2009 | Polivka | 434/350 |
| 2010/0010999 A1 | 1/2010 | Gerovac et al. | |
| 2010/0011002 A1 | 1/2010 | Gerovac et al. | |
| 2010/0011003 A1 | 1/2010 | Carver et al. | |
| 2010/0011091 A1 | 1/2010 | Carver et al. | |
| 2010/0011096 A1* | 1/2010 | Gerovac et al. | 709/223 |
| 2010/0011145 A1 | 1/2010 | Carver et al. | |
| 2010/0011364 A1 | 1/2010 | Gerovac et al. | |
| 2010/0011365 A1 | 1/2010 | Gerovac et al. | |

OTHER PUBLICATIONS

Ruemmler, et al., "An introduction to disk drive modeling." IEEE Computer Magazine, 27(3), pp. 17-29, Mar. 1994.
Talagal, et al., "Microbenchmark-based extraction of local and global disk characteristics", Technical Report. Department of Computer Science, University of California at Berkeley, CSD-99-1063, 1999.
Schindler, et al., "Automated disk drive characterization", Technical Report CMU-CS-99-176, Carnegie Mellon University, Nov. 1999.
Worthington, et al., "On-Line Extraction of SCSI Disk Drive Parameters" SIGMETRICS 95, pp. 146-156, 1995.
Teorey, et al., "A Comparative Analysis of Disk Scheduling Policies", Communications of the ACM, v.15 n.3, pp. 177-184, Mar. 1972.
Oney, "Queueing Analysis of the Scan Policy for Moving-Head Disks", Journal of the Association for Computing Machinery, vol. 22, No. 3, Jul. 1975, pp. 397-412.
Worthington, et al., "Scheduling for Modern Disk Drives and Non-Random Workloads", University of Michigan, Technical Report CSE-TR-194-94, Mar. 1, 1994.
Reddy, et al., Issues in a multimedia system, IEEE Computer Magazine 27, 3, pp. 69-74, Mar. 1994.
Zimmermann, "Continuous Media Placement and Scheduling in Heterogeneous Disk Storage Systems", Technical Report USC-99-699, 1999.
Shenoy, et al., "Cello: A Disk Scheduling Framework for Next Generation Operating Systems", Real-Time Syst. 22, 1-2, 9-48, Jan. 2002.
Goel, et al., "SCADDAR: An Efficient Randomized Technique to Reorganize Continuous Media Blocks", 18th International Conference on Data Engineering (ICDE 2002), San Jose, California, Feb. 26-Mar. 1, 2002.
Shahabi, et al., "Yima: A Second-Generation Continuous Media Server", IEEE Computer Magazine, pp. 56-64, Jun. 2002.
Schroeder, et al., "Disk failures in the real world: What does an MTTF of 1,000,000 hours mean to you?", Proceedings of the 5th USENIX Conference on File and Storage Technologies (FAST '07), pp. 1-16, 2007.
Pinheiro, et al., "Failure Trends in a Large Disk Drive Population", Proceedings of the 5th USENIX Conference on File and Storage Technologies (FAST '07), pp. 17-28, 2007.
Amazon, "Amazon S3 Developer Guide (API Version Mar. 1, 2006)", Internet, 2007.
Liskov, et al., "Providing Persistent Objects in Distributed Systems", Proceedings of the 13th European Conference on Object-Oriented Programming, Jun. 14-18, 1999.
Liskov, et al., "Transactional File Systems Can Be Fast", Proceedings of the 11th Workshop on ACM SIGOPS European Workshop: Beyond the PC, Sep. 19-22, 2004.
Braam, "File Systems for Clusters from a Protocol Perspective", Second Extreme Linux Topics Workshop, Monterey, Jun. 1999.
Hartman, et al., "The Zebra Striped Network File System", ACM Transactions on Computer Systems, vol. 13, No. 3, pp. 274-310, Aug. 1995.
Long, et al., "Swift/RAID: A Distributed RAID System", Computer Systems, vol. 7, No. 3, pp. 333-359, Jun. 1994.
Patterson, et al., "A Case for Redundant Arrays of Inexpensive Disks (RAID)" Proceedings of the 1988 ACM SIGMOD International Conference on Management of Data, ACM Press, Jun. 1988.
Chen, et al., RAID: High-Performance, Reliable Secondary Storage, ACM Computer Survey vol. 26, No. 2, pp. 145-185, Jun. 1994.
Stonebraker, et al., "Distributed RAID—A New Multiple Copy Algorithm", Proceedings of the Sixth International Conference on Data Engineering, IEEE Computer Society, pp. 430-437, Feb. 1990.
Liu, et al., "Scheduling Algorithms for Multiprogramming in a Hard-Real-Time Environment", J. ACM, vol. 20, No. 1, pp. 46-61, Jan. 1973.
Sha, et al., "A Systematic Approach to Designing Distributed Real-Time Systems", IEEE Computer Magazine, vol. 26, No. 9, pp. 68-78, Sep. 1993.
Thouin, et al., "Video-on-Demand Networks: Design Approaches and Future Challenges", IEEE Network, Special Issue, vol. 21, No. 2, pp. 42-48, Mar. 2007.
Stoller, et al., "Storage Replication and Layout in Video-on-Demand Servers", Proceedings of the 5th International Workshop on Network and Operating System Support for Digital Audio and Video, Apr. 19-21, 1995.
Tetzlaff, et al., "Elements of scalable video servers", Proceedings of the 40th IEEE Computer Society International Conference, pp. 239-248, Mar. 1995.
Wong, et al., "Strategic Selection and Replication of Movies by Trend-Calibrated Movie-Demand Model", Proceedings of the 2000 international Conference on Microelectronic Systems Education, IEEE Computer Society, pp. 97-100, Nov. 2000.
Little, et al., "Popularity-Based Assignment of Movies to Storage Devices in a Video-on-Demand System", Multimedia Systems, vol. 2, No. 6, pp. 280-287, Jan. 1995.
Griwodz, et al., "Long-term Movie Popularity Models in Video-on-Demand Systems", Proceedings of the 5th ACM International Conference on Multimedia, pp. 349-357, Nov. 1997.
Ghandeharizadeh, et al., "Continuous Display of Video Objects Using Multi-Zone Disks", Univ. of Southern California, USC-CSE-94-592, Apr. 12, 1995.
Sinah, et al., "Intelligent Architectures for Managing Content", Communications Technology Magazine, May 1, 2003.
PCT Search Report of the ISA for PCT/US2009/050057 dated Jan. 14, 2010.
Written Opinion of the ISA for PCT/US2009/050057 dated Jan. 14, 2010.
Office Action dated May 7, 2010 for U.S. Appl. No. 12/170,769.
Androutsellis-Theotokis et al; "A Survey of Peer-to-Peer Content Distribution Technologies;" AMC Computing Surveys, vol. 36, No. 4; Dec. 3004; pp. 335-371.

(56) References Cited

OTHER PUBLICATIONS

Gal: "Algorithms and Data Structures for Flash Memories;" ACM Computing Surveys, vol. 37, No. 2; DOI=http://doi.acm.org/10.1145/1089733.1089735; Jun. 2005; pp. 138-163.

Mourad; "Issues in the design of a storage server for video-on-demand;" Multimedia Systems; vol. 4, No. 2; Apr. 1, 1996; XP008040912; pp. 70-86.

"NAND Flash Memories and Programming NAND Flash Memories Using ELNEC Device Programmers Application Note Version 2.01;" Sep. 2006, pp. 1-31.

Samsung Memory Division; NAND Flash ECC Algorithm 256B; Jun. 24, 2004; 8 sheets.

Samsung Memory Division; ECC Algorithm; 512B; Apr. 28, 2005; 8 sheets.

Samsung Memory Division; NAND Flash Spare Area Assignment Standard; Apr. 27, 2005; 5 sheets.

Venugopal et al.; "A Taxonomy of Data Grids for Distributed Data Sharing, Management, and Processing;" AMC Computing Surveys, vol. 38, Mar. 2006; Article 3, pp. 1-53.

PCT Search Report of the ISA for PCT/US2008/061401 dated Jul. 1, 2008.

PCT Search Report and Written Opinion of the ISA for PCT/US2009/050051 dated Sep. 7, 2009.

PCT Invitation to Pay Additional Fees dated Oct. 26, 2009 for PCT Pat. No. PCT/US2009/050057 filed on Jul. 9, 2009.

\* cited by examiner

DISTRIBUTED COMPUTING WITH MULTIPLE COORDINATED COMPONENT COLLECTIONS

CROSS-REFERENCE TO RELATED APPLICATIONS

This application is related to U.S. application Ser. No. 12/170,769, filed Jul. 10, 2008, and U.S. application Ser. No. 12/170,657, filed Jul. 10, 2008 (now U.S. Pat. No. 8,099,402, the contents of which are incorporated herein by reference in their entirety.

BACKGROUND

This specification relates to distributed computing with multiple coordinated component collections.

Scaling distributed computing systems to large numbers of nodes can be complicated for a variety of technical reasons. For example, certain functions require a coherent interface to data at different nodes of the system. Some implementations of such coherent interfaces require centralized control or other approach that may limit performance as the number of nodes grows. Furthermore, different functions of the system may require different types of coordination. For example, some functions may require relatively precise timing coordination between nodes, and some functions may be able to run relatively asynchronously of others.

An example of a distributed computing system provides storage and access to content, such as multimedia content. A distributed implementation of such a system may exhibit some of the features described above. To provide very high capacity, both in storage and access rate, it is desirable to be able to efficiently scale such a system to a large number of nodes.

SUMMARY

In general, in one aspect, the invention features a system having components that collectively perform functions and services of the system. The components are managed as belonging to at least a first component collection and a second component collection. The components of the first component collection operate at a time scale that is substantially temporally independent of the components of the second component collection. The components of the first component collection have a first set of temporal requirements and the components of the second component collection have a second substantially different set of temporal requirements.

Aspects of the invention may include one or more of the following.

The components of the system are further managed as belonging to a third component collection. The components of the third component collection operate at a time scale that is substantially temporally independent of the components of the first and second component collections. The components of the third component collection have a third set of temporal requirements, the third set of temporal requirements being substantially different from both the first and second sets of temporal requirements.

The components of each component collection internally coordinate respective operations in accordance with a collection-specific consistency model.

The components may be hosted on a plurality of nodes that are interconnected by a data network.

The components of the first component collection may be hosted on a first plurality of nodes that are interconnected by a data network, and the components of the second component collection may be hosted on a second plurality of nodes that are interconnected by the data network.

The components of the first component collection may be hosted on a first plurality of nodes that are interconnected by a data network, the first plurality of nodes including a first node, and the components of the second component collection may be hosted exclusively on the first node.

At least one of the component collections implements a consistency approach for maintaining a shared state accessible to components of that component collection.

The external interfaces of the system may be exposed by multiple of the component collections.

In general, in another aspect, the invention features a system having components that collectively perform functions of the system. The components are managed as belonging to respective ones of the following planes: a system plane, a content plane, a session plane, an access plane, and a transfer plane. The components of each plane operate at a time scale that is substantially temporally independent of the components of any one of the other planes, and the components of each plane have temporal requirements that are substantially different from those of components of any one of the other planes.

Aspects of the invention may include one or more of the following features.

The components of each plane may internally coordinate respective operations in accordance with a plane-specific consistency model.

The components of the system plane may collectively perform functions that provide overall visibility and management of the system.

The components of the content plane may collectively perform functions that organize and manage content storage on the system.

The components of the session plane may collectively perform session management functions. The session management functions may include one or more of the following: session initiation, session termination, and session-specific resource allocation.

The components of the access plane may collectively perform functions to enable data transfers associated with one or more storage resource elements.

The components of the transfer plane may collectively implement functions to perform data transfers.

The components may be hosted on a plurality of nodes that are interconnected by a data network.

In general, in another aspect, the invention features a method that includes managing components of a system as belonging to at least a first component collection and a second component collection, enabling components of the first component collection to operate on a time scale that is substantially temporally independent of a time scale on which the components of the second component collection operate, and internally coordinating operations executed by components of the first component collection in accordance with a first set of temporal requirements and separately internally coordinating operations executed by components of the second component collection in accordance with a second different set of temporal requirements.

Aspects of the invention may include one or more of the following features.

The method may further include enabling communication of requests between components of the first and second component collections without requiring coordination of distinct requests.

The method may further include enabling communications to pass between pairs of planes without regard as to coordination requirements of the components associated with the respective communications.

The method may further include enabling communications to pass between pairs of components that operate on different time scales.

In one aspect, in general, a distributed system is hosted on multiple interconnected nodes. The system includes a number of planes, each plane including a number of components hosted on nodes of the system. Each plane independently implements a consistency approach among distributed components of that plane. The system has interconnections between interfaces of the planes. Each plane provides interfaces to other planes at one or more of the nodes without guaranteeing consistency for requests received at the interfaces to other planes. In one example, the system is applied to the storage and access of multimedia content, in which a transfer plane includes components for transfer of content between nodes and a system plane includes components for managing configuration information for the system.

Aspects can include one or more of the following advantages.

Independent coordination of components at different planes allows use of different coordination approaches, each appropriate to the functions provided by the plane. This may provide an overall performance advantage and may simplify specification and development of the overall system.

A coordination approach implemented at one plane is isolated from performance requirements at another plane. For example, a function blocked at one plane does not directly impact timing performance of functions at another plane.

Development of software or other specifications of the planes is simplified by avoiding consistency guarantees between the planes. For example, permitting any order of handling of inter-plane requests imposes no or minimal additional consistency requirements within a plane.

Other features and advantages of the invention are apparent from the following description, and from the claims.

DESCRIPTION

Figure 1:
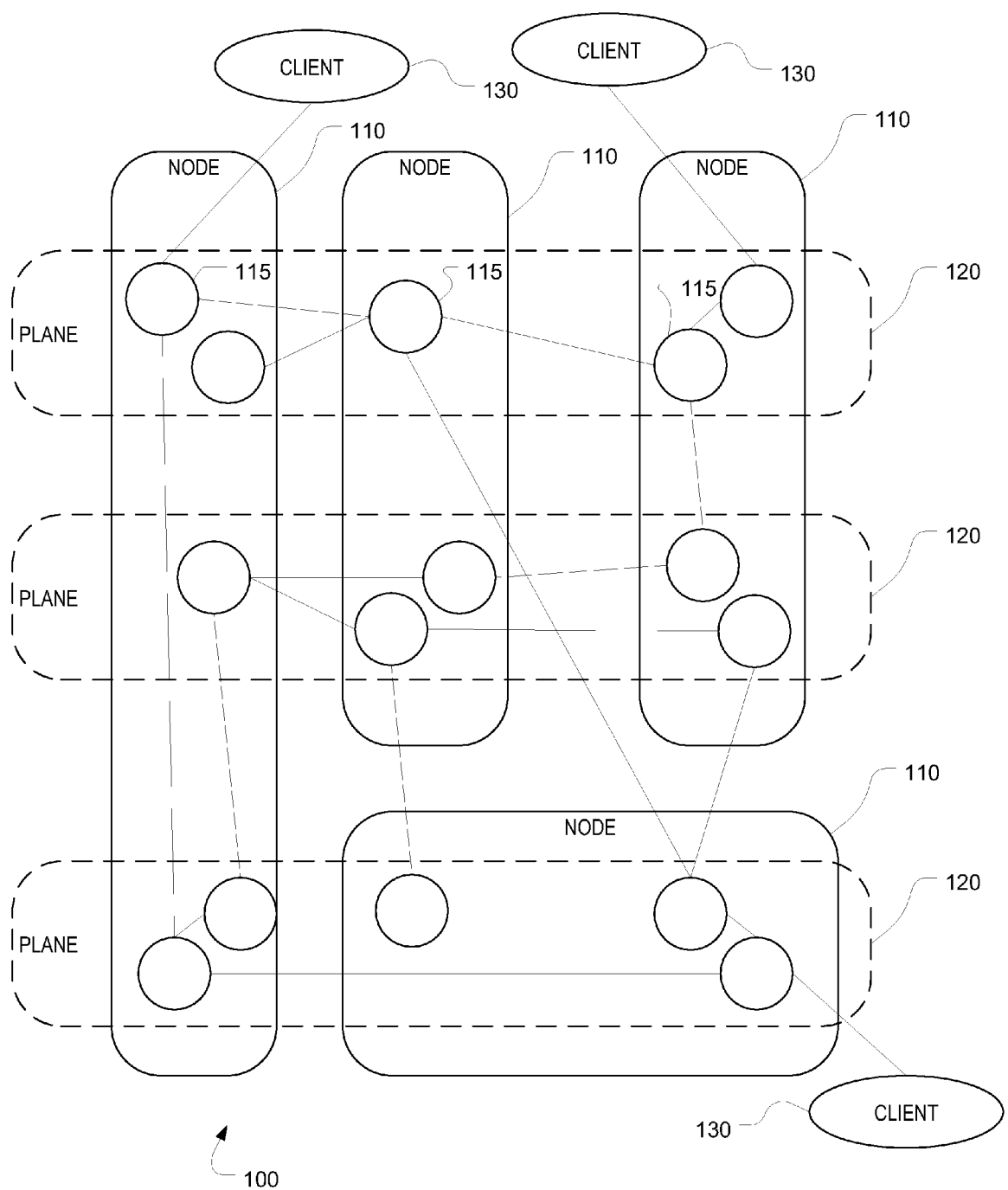
FIG. 1 is a block diagram of a system.

U.S. application Ser. No. 12/170,769 and U.S. application Ser. No. 12/170,657 describe aspects of a system for content storage and delivery. Referring to FIG. 1, in some embodiments, such a system 100 is hosted on a large number of distributed computing platforms 110, which may be referred to as "nodes," coupled by communication networks (not illustrated in FIG. 1). For example, large numbers of computers are interconnected by one or more data networks, such as local or wide area Internet Protocol (IP) based data networks. In order to avoid limitations, such as communication bottlenecks, potential deadlock, etc. as the number of nodes grows, for example, to hundreds or thousands of nodes or more, an approach to coordinating operation of the nodes involves partitioning the components 115 that implement the various functions performed and/or services provides into a number of different groups 120. These groups are referred to below as "independently coordinated domains" or "planes" without intending to imply any particular characteristics of these groups through the use these terms.

Each plane 120 communicates with one or more other planes, and at least some of the planes communicate with external clients 130 of the system. In some embodiments the planes are arranged as a linear sequence with each plane communicating with neighboring planes in the sequence, but in general, each plane is not limited to communicate with particular other planes.

In some examples, communication between planes is based on a request-acknowledgment approach in which a request message is passed from one plane to another and some time later an acknowledgment and/or an indication that a requested action has completed is passed back.

As an example of components 115 of the content storage and access system that may be grouped into a plane are components that together handle allocation of content storage resources for particular content items that are stored in the system. For example, these components may be responsible for determining the particular disk drives that house a digital representation of a movie that can be later accessed for presentation to viewers. The allocation function requires a degree of coordination across different nodes, for example, to avoid a situation in which different nodes each receive a different new content item but allocate the same storage resources to the different new items in a conflicting or otherwise undesirable manner.

As another example of components 115 that may be grouped into a plane 120 are components that operate at a time scale that is substantially different than other of the planes. For example, components responsible for a low-level transfer of data from node to node of the system operate at a time scale that is substantially faster than components responsible for allocation of resources for new content items being added to the system. Such components may also have very different coordination requirements between nodes than other planes, for example, using communication protocols between two or more nodes to maintain a desired degree of consistency over the entire plane without requiring centralized coordination across all nodes hosting the plane.

In general, each plane 120 includes components 115 that are hosted on a number of different nodes 110 of the system, and for each plane an independent approach to maintaining a particular consistency model across its components for resources controlled within that plane is implemented. For example, in a plane in which components allocate shared resources, the components of the plane operate according to the consistency model for that plane that guarantees resources are not inadvertently allocated in a conflicting manner.

Communication between planes is distributed, for example, with separate communication paths existing between planes (i.e., between components of the planes) at any of the nodes of the system. In general, the grouping of components into planes is such that interactions between planes do not require substantial synchronization or other types of coordination between planes. For example, the consistency model provided by the external interfaces of a control plane may be substantially weaker than the consistency model used for internal functions within the plane.

In some embodiments, the consistency model that is provided between planes provides no guarantees regarding the ordering of execution of requests made at different of its communication ports. For example, if two requests are made at different nodes in one order, there is no guarantee that the requests will be handled in that order, and even if two requests are made in a certain order at one node, the order of handling the requests is not guaranteed. Using such a weak consistency model, a plane that provides a service to other planes is free to implement its internal operations without having to coordinate its components according to a constrained consistency model. In other embodiments, a control plane may provide a somewhat more constrained consistency model through its external interfaces, for example, maintaining ordering at one node but not across different nodes. In general, the internal consistency model for a plane is more constrained than that provided through its external interfaces.

With such a relatively weak synchronization between planes, the implementation of internal consistency can be appropriate to the functions performed within the plane, and can provide desirable scaling properties. For example, in the case of a resource allocation function, at one extreme, allocation information is centralized at a single node, and other nodes communication with the central node for all requests. Such an implementation may provide simplicity, but may have undesirable communication characteristics, for example, resulting in undesirably large amounts of communication with the central node or resulting in undesirable latency of the handling of requests by the central node. In other implementations, the allocation information is distributed to avoid much of the internode communication. For example, components at different nodes may communicate to pre-allocate a portion of the shared resource to be used to handle requests made through an external interface to the plane at a node, and may communicate relatively slowly and/or with relatively little data to maintain a balance of the amounts of free resources that are preallocated at each node. Note, however, that the implementation of the internal consistency of allocation information is independent of the external consistency for the plane. For example, a request made first at one node may not get resources that are provided in response to a later request made at another node. Because the plane does not guarantee the ordering of the external requests, there are in general more and preferable alternative implementations of the internal consistency to achieve the desired functions implemented by the components of the plane.

In embodiments in which limited or no guarantees are made for consistency of inter-plane requests, each plane is responsible for implementing its own consistency. For example, if a first plane requires that a first request of a second plane is completely serviced before a second request made at the same or a different node, the first plane must wait to determine that the request has been completed, for example, by receiving a confirmation from the second plane, before issuing the second request.

As introduced above, in some embodiments, the separation of functions into different planes is based at least in part on the different time scales of operation of the functions within that plane. For example, in a plane that executes at a relatively slow time scale and with relatively weak latency requirements, a coordination approach that results in high latency may be acceptable. For example, a token passing or locking approach in which only a single node is enabled to access shared resources at any one time within the plane may be an example of such a coordination approach. On the other hand, a data transfer function at another plane may not be able to tolerate the latency that could be introduced by such a coordination approach. By separating the functions into different planes, the approach to maintaining consistency within each plane may be tailored to the time scale of operations (e.g., the latency requirements) of functions in each of the planes.

In some embodiments, components at different planes at a node can be segregated into different processing units at the node. Examples of such processing units are operating system processes, lightweight processes, and threads. For example, by having each process belong to only a single plane, interactions between planes, such as blocking interactions, are avoided or minimized. In some embodiments, scheduling and/or prioritization approaches to executing the processing units can be matched to the requirements of the different planes. For example, certain planes may have higher priority than other planes, may preempt execution of other planes, and may have different durations of time slices than other planes in a time sharing approach.

In some embodiments, communication within a plane may use different communication resources than communication between planes. For example, a separate network may be used for passing data between components in a data transfer plane, with a different network being used for communication at other planes and between planes. Similarly, different types of communication approaches may be used at different planes. For example, packet-switched data communication may be used at certain planes, with dedicated point-to-point communication may be used at other planes, such as at a data transfer plane.

Figure 2:
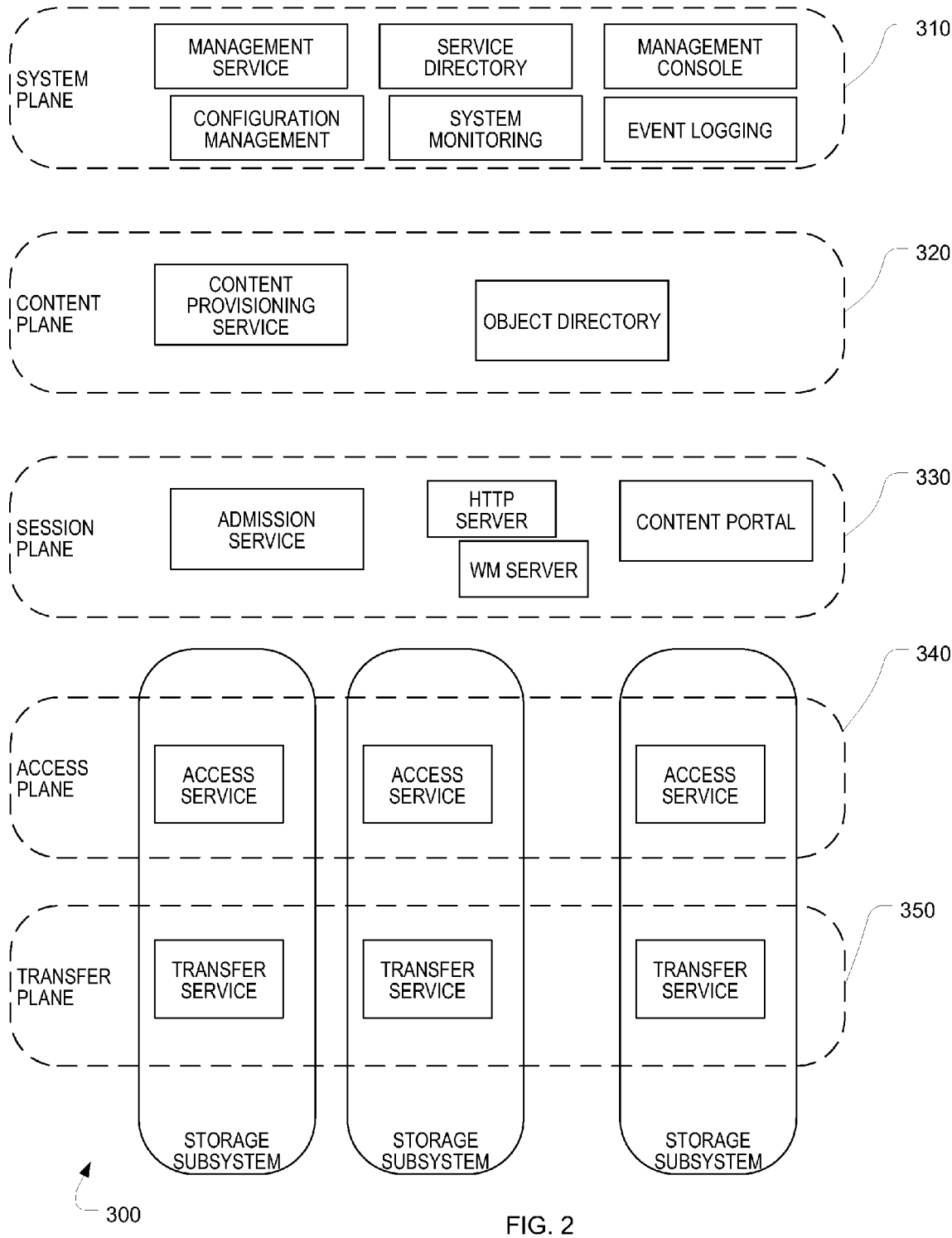
FIG. 2 shows an exemplary content storage and delivery system.

Referring to FIG. 2, an example of a content storage and delivery system 300 uses five independent coordinated domains, or planes 310-350. Each plane supports a distributed set of related and cooperating functionality that can operate under normal conditions without relying on strict coordination between planes. There is a mapping of state and context between planes and a transfer of messages between planes. A removal or reduction of inter-plane coordination requirements helps improve performance and scalability in the system.

The five planes illustrated in FIG. 2 include the following.
  The System plane 310 components provide overall visibility and management of the entire system; the System plane has a view of the entire system
  The Content plane 320 components organize and manage how content is stored on the system
  The Session plane 330 components initiate sessions, terminate sessions, allocate resources needed to support sessions, and generally manage sessions
  The Access plane 340 components request data transfers from storage
  The Transfer plane 350 components perform the data transfers The most stringent real-time performance requirements are in the access 340 and transfer 350 planes of the system shown in FIG. 2. The other three planes, in general, have less stringent performance requirements and can be optimized according to factors other than performance, for example, ease of implementation, cost of equipment, richness of features, or ease of extensibility. As introduced above, each plane is itself a distributed systems environment, and can be thought of as existing across the entire system, though not necessarily uniformly distributed across each and every node of the system.

In this example application, the system plane 310 has overall visibility and management of the entire system. The system plane includes configuration management, system control, system monitoring, and event/status logging functions. There are no (or relatively weak) real-time performance requirements for operations that are performed in the system plane. In some implementations, all operations in the system plane are performed on best effort basis, and can be implemented in a manner that does not compromise real-time requirements of operations in other planes. Components of the system plane may provide external interfaces for the system, for example, for management clients to access status information for the system.

Configuration management, one function of the system plane, maintains an overall connectivity map of all components in the system, a complete topology down to a level of detail of individual referenceable or replaceable components, e.g., disk drives or motherboards. The configuration management function maintains information about the functioning of each component in the system, such as health and performance monitoring, e.g., disk performance with regard to nominal parameters. Configuration information is updated dynamically during system operation to reflect the current state of the system as changes occur. Note that configuration information available within the system plane may be slightly out of sync with the true state of the system, temporarily. However, the implementation logic within the system plan is implemented so that this does not present a problem for operations across of the system. For example, each operation is responsible for reconciliation if a true state of the system causes the operation to fail based on the state within the plane.

Configuration information is used by the content plane to determine how to allocate content most effectively. Configuration information and current system state is used by the session plane to determine how to allocate system resources to a session. Within the system plane, configuration information is used by system management and control components. For example, if a particular disk is beginning to show signs of possible failure, then maintenance for that disk can be scheduled, and content and load can be shed from that disk. Another example arises when a system is operating normally, but is beginning to reach an operational threshold, e.g., low remaining storage capacity. The amount and type of information retained about each component is determined by the requirements of other components of the system. Many of the functions and operations in the system plane are driven by system management requirements and specific application use requirements.

The content plane 320 provides overall management of content in the entire system. The content plane includes a content provisioning function and an object directory for maintaining the results of provisioning. There are no strict real-time performance requirements for operations that are performed in the content plane; all operations are best effort, and can be implemented in a manner not to compromise real-time requirements of operations in the other planes.

The content provisioning function is responsible for the allocation and assignment of content to storage. How content is provisioned is determined in order to optimize operational objectives of using the content in the system. Such objectives include accessibility (popularity), resilience, and integrity. Additional objectives can be included as well (e.g., security, topological affinity, or geographic affinity) and can also depend on characteristics of a particular system installation. Further, content may have a lifecycle model that describes how provisioning objectives change over time. Content provisioning may follow a predetermined schema, select one of many predetermined schema according to parameters for a schema selection scheme, or using an automated process approximating an optimal arrangement.

In some embodiments, a collection of schema is used to provision content during normal operation of the system. An individual piece of content has an operational objective, such as particular values of accessibility, resilience, and integrity. A schema is selected to provision that content to meet that operational objective. The content plane is responsible for this processing.

The session plane 330 embodies and supports one or more media access regimes. Examples of media access regimes include HTTP access, Microsoft® Windows Media Server™, Adobe® Flash Media® Server, RealNetworks® Helix DNA™ server, and other such access regimes. Session plane components manage sessions established for access regimes and manage the resources needed to service those sessions. The major functional components in the session plane include access regime server (e.g., media server), admission (including session management), resource reservation (and management), and object access and transfer. The session plane includes interfaces to external clients of the system, for example, that request specific content from the system.

The session plane bridges real-time and non-real-time operations in the overall system. There are no strict real-time performance requirements for operations other than access and transfer related operations. Session plane operations generally have soft real-time performance requirements, meaning that such operations have defined performance objectives but without strict real-time constraints. There are no real-time dependencies on non-real-time operations in other planes. Strict real-time dependencies are localized and decoupled within the session plane, meaning that session coordination requirements are localized and bounded (e.g., coordination within a session but not across sessions). Session plane operations can rely on the strict real-time performance characteristics of access and transfer plane operations.

An access regime requests the creation of a session from an admission component. Generally, the access regime does this due to an external request to the regime (e.g., a remote Windows Media Client initiates a stream with a Windows Media Server Access Regime). The admission component is responsible for determining whether there are sufficient system resources to admit a requested session. If sufficient resources are available, then the session is created and resources needed for the session are reserved for the duration or tenure of the session; if there are insufficient resources, the session creation request is denied. Finally, when the session is no longer needed or upon request, the session is terminated, and reserved resources are released.

Each access regime may have a slightly different notion of session. For example, a particular access regime may not require that resources be reserved for the entire duration of the session, in which case, how and/or when resource reservation occurs may differ from the basic mechanism. Admission relies, in part, on the decisions made during content provisioning and system configuration. In essence, system configuration, content provisioning, and admission, though decoupled and operating in different temporal planes, are nonetheless cooperative.

The system is configured to support an expected nominal workload (i.e., a model workload). During ongoing content provisioning, content is provisioned as requested on the system. If provisioning is successful overall, then the overall provisioning will support a prescriptive workload that is roughly comparable to or within the bounds of the expected nominal workload. When each new session is requested, its resource requirements have already been factored into the system configuration and provisioning. Therefore, deciding whether a new session can be supported is a quick matter of looking up whether the new session fits into the prescriptive workload.

If a new session deviates from the prescriptive workload, but nonetheless can be supported, the session can be created, and other operations can be signaled to determine whether the system should be re-provisioned or reconfigured. If the new session would exceed the prescriptive workload, other operations can be signaled to determine whether the system should be re-provisioned, reconfigured, or upgraded.

The access and transfer planes provide the mechanisms by which data is moved into and out of storage. Access and transfer are separate planes but conceptually closely linked. A request made of the access plane results in the transfer of data in the transfer plane. In an example configuration, access and transfer bridge between access servers and storage servers. Storage servers operate largely within the temporal context of the transfer and access planes.

Components of the access plane 340 and transfer plane 350 each have significant real-time performance requirements. A relationship exists between the individual real-time requirements across session, access, and transfer planes, but the relationship is limited to an individual request. There are no ordering rules between requests—request order and transfer completion order are not preserved.

As an example of operation of the planes, a media server component in the session plane issues a request for a block of data to the data storage access component in the access plane 340 optionally specifying a certain time (a deadline) by which the data is needed in order to satisfy its isochronous delivery requirements. To satisfy the request for the block of data, the data storage access component in the access plane makes a request to the storage subsystem to fetch the data, for example, from disk storage.

In some embodiments, a storage subsystem is a node in the system, which hosts both the access and transfer planes. The data is requested by a component in the storage subsystem that is in the access plane, and the request is accepted by a component of the storage subsystem in the transfer plane. The order of operation of the requests from the access plane need not be guaranteed by the transfer plane. A transfer component in the transfer plane then delivers the fetched data to the media server, which is part of the session plane. The media server component's deadline is across the entire chain of operations.

Complexity may arise when the number of outstanding requests increases, e.g., as the number of simultaneous sessions increases. Access delay (e.g., seek time of a disk) is significant with respect to each deadline and multiple transfers are subject to collision (e.g., because they are occurring over a network). In an example configuration, where there are 15,000 sessions, all with strict real-time requirements, requesting an aggregate of 37.5 Gbs, among 4 storage and 4 access servers. The system needs to continue to operate and provide service at a predictable or prescribed level in the presence of failures of disks, servers, and other components. The multiple plane approach is designed to achieve this level of performance by reducing synchronization points (e.g., points where a process is blocked waiting for other processes to reach a certain state in adherence to a consistency model).

Explicitly separating access and transfer removes constraints on disk scheduling, buffer management, and data transfer, so that each of these can be optimized locally (e.g., within a single plane). The need for coordination within the access and transfer planes is generally reduced and managed by the decisions made during session admission, content provisioning, and system configuration. Functions within the access and transfer planes are decoupled from many of these decisions. The abstract workload and the provisioned workload provide a context of implicit coordination and synchronization. Thus, as long as the accesses and transfers are within the bounds prescribed in the provisioned workload, then explicit coordination can be largely avoided. Usually, no implicit coordination is needed between requests within a storage server or across storage servers. Eliminating such constraints removes a major barrier to scaling.

The approaches described above are applicable to other systems than content storage and delivery systems. For example, other distributed systems with one or more groups of management and coordination functions as well as one or more groups of time critical functions can be addresses using these approaches.

In general, the design approaches are manifested in the runtime implementation of the system, for example, in the processes and their interprocess communication requirements. In some implementation, separation into different planes is manifested in the system specification, but may not necessarily be represented explicitly in the runtime implementations. For example, a compilation (or other software building process) may take the specifications of distinct planes and combine them into specifications for operation of different nodes.

In some examples, some planes are implemented in software while other planes are implemented in hardware. For example, a fast time scale plane may be implemented according to a specification of the plane in hardware, while slower time scale planes may be implemented in software.

In general, the system elements and the functional operations described in this specification can be implemented in digital electronic circuitry, or in computer hardware, firmware, software, or in combinations of them. They can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps described above can be performed by one or more programmable processors executing a computer program to perform functions by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind, scale, or organization of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A system comprising:
one or more processors; and
one or more memories including a plurality of instructions that, when executed by the one or more processors, cause the one or more processors to:
group information regarding a plurality of components into a plurality of planes, based on one or more operations that are performed by the plurality of components, each of the plurality of components being implemented at least partially in hardware,
one or more first particular components, of the plurality of components, performing a same operation being grouped with one or more second particular components, of the plurality of components, that perform the same operation and not being grouped with one or more third particular components, of the plurality of components, that do not perform the same operation,
the plurality of components collectively performing functions of the system, the plurality of planes including:
a system plane,
a content plane,
a session plane,
an access plane, and
a transfer plane,
each of the plurality of planes being different from one another,
components, of each of the plurality of planes, operating at a time scale that is temporally independent of a time scale of the components of other ones of the plurality of planes,
the system plane, the content plane, and the session plane each being associated with one or more non-real-time operations,
the access plane and the transfer plane each being associated with one or more real-time operations,
the session plane bridging the non-real-time operations and the real-time operations, and
the components, of each of the plurality of planes, having temporal requirements that are different from temporal requirements of the components of other ones of the plurality of planes.

2. The system of claim 1, where the components of each plane, of the plurality of planes internally coordinate respective operations in accordance with a model.

3. The system of claim 1, where the components of the system plane collectively implement functions that provide overall visibility and management of the system, and
where the functions that provide overall visibility and management of the system include a function that maintains at least one of:
information identifying interconnections of each of the plurality of components, or
information identifying health and performance of each of the plurality of components.

4. The system of claim 1, where the components of the content plane collectively implement functions that organize and manage content storage on the system,
where the functions that organize and manage the content storage on the system include a function that at least one of allocates content to one or more storage devices associated with the system or assigns content to the one or more storage devices.

5. The system of claim 1, where the components of the session plane collectively implement session management functions.

6. The system of claim 5, where the session management functions include at least one of: a session initiation function, a session termination function, or a session-specific resource allocation function.

7. The system of claim 1, where the components of the access plane collectively implement functions to enable data transfers associated with one or more storage resource elements of the system.

8. The system of claim 1, where the components of the transfer plane collectively implement functions to perform data transfers associated with one or more storage devices of the system.

9. The system of claim 1, where the plurality of components are hosted on a plurality of devices that are interconnected by a data network, and
where components of at least two of the plurality of planes are hosted on a single device.

10. The system of claim 1,
where the system plane comprises a first plurality of hardware components that are unique to the system plane,
where the content plane comprises a second plurality of hardware components that are unique to the content plane,
where the session plane comprises a third plurality of hardware components that are unique to the session plane,
where the access plane comprises a fourth plurality of hardware components that are unique to the access plane, and
where the transfer plane comprises a fifth plurality of hardware components that are unique to the transfer plane.

11. A system comprising:
one or more processors; and
one or more memories including a plurality of instructions that, when executed by the one or more processors, cause the one or more processors to:
group a plurality of components into a plurality of planes of based on one or more operations that are performed by the plurality of components, each of the plurality of planes being implemented at least partially in hardware and each plane, of the plurality of planes, including at least one of the plurality of components,
one or more first particular components, of the plurality of components, performing a same operation being grouped with one or more second particular components, of the plurality of components, that perform the same operation and not being grouped with one or more third particular components, of the plurality of components, that do not perform the same operation, and
components, of at least two of the plurality of planes, being hosted on a single node of a plurality of interconnected nodes; and
provide one or more interconnections between interfaces of the plurality of planes,
each plane, of the plurality of planes, independently implementing a consistency approach among distributed components of the plane,
each plane, of the plurality of planes, providing one or more interfaces to other planes, of the plurality of planes, at one or more computing platforms without guaranteeing, to the other planes, of the plurality of planes, an order of execution of requests, received at the interfaces, in an order in which the requests were received, a first plurality of planes each being associated with one or more non-real-time operations, a second plurality of planes each being associated with one or more real-time operations, a plane, of the first plurality of planes, bridging the non-real-time operations and the real-time operations, and the components of each plane, of the plurality of planes, operating at a time scale that is independent of a time scale of the components of other planes, of the plurality of planes.

12. The system of claim 11, where at least one of the plurality of planes implements a consistency approach for maintaining a shared state accessible to components of the at least one of the plurality of planes.

13. The system of claim 11, where external interfaces of the system are provided by multiple ones of the plurality of planes.

14. The system of claim 11, where the plurality of planes include:

a transfer plane that includes components for transfer of content between nodes of the plurality of interconnected nodes, and a system plane that includes components for managing configuration information for the system, where the configuration information includes information identifying health and performance of each of the plurality of components.

15. A method comprising:

grouping, by a device, a plurality of components into a plurality of planes based on one or more operations that are performed by the plurality of components, one or more first particular components, of the plurality of components, performing a same operation being grouped with one or more second particular components, of the plurality of components, that perform the same operation and not being grouped with one or more third particular components, of the plurality of components, that do not perform the same operation, and the plurality of planes including:
a content plane,
a session plane,
an access plane, and
a transfer plane, managing, by the device and using one or more components of the content plane, storing of data on one or more storage resources associated with the device;

managing, by the device and using one or more components of the session plane, one or more sessions for accessing data stored on at least one of the one or more storage resources;

requesting, by the device and using one or more components of the access plane, transfer of data from the one or more storage resources; and transferring, by the device and using one or more components of the transfer plane, data between the one or more storage resources, the content plane and the session plane each being associated with one or more non-real-time operations, the access plane and the transfer plane each being associated with one or more real-time operations, the session plane bridging the non-real-time operations and the real-time operations, and the one or more components of each plane, of the plurality of planes, operating at a time scale that is different than a time scale of the components of other planes, of the plurality of planes.

16. The method of claim 15, where a component, of the plurality of components, that is associated with transfer of data, operates at a time scale that is faster than a time scale of another component, of the plurality of components, that is associated with storing data.

17. The method of claim 15, where managing the one or more sessions includes:

creating a session based on a threshold workload associated with the device; and allocating resources for the created session for a portion of a duration of the session.

18. The method of claim 15, further comprising:
arranging the plurality of planes in a linear sequence.

19. The method of claim 15, further comprising:
transmitting, from one of the plurality of planes, a request message to another one of the plurality of planes; and receiving, by the one of the plurality of planes, an acknowledgement message, based on the transmitted request message, from the other one of the plurality of planes.

20. The method of claim 15, where the time scale is based on information regarding a data transfer from a first node to a second node.

* * * * *